(12) United States Patent
Kowalski et al.

(10) Patent No.: US 11,651,590 B2
(45) Date of Patent: May 16, 2023

(54) OPERATION MANAGEMENT SYSTEM UTILIZING A WEARABLE DEVICE

(71) Applicant: ZEBRA TECHNOLOGIES CORPORATION, Lincolnshire, IL (US)

(72) Inventors: Matthew Louis Kowalski, Merrick, NY (US); Andrew Ehlers, Elmhurst, IL (US); Nathan J. Clevenger, Burnsville, MN (US); Scott R. Olson, St. Paul, MN (US); Seth David Silk, Barrington, IL (US); Nicole Daphne Tricoukes, Seaford, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 81 days.

(21) Appl. No.: 17/161,011

(22) Filed: Jan. 28, 2021

(65) Prior Publication Data
US 2022/0237399 A1    Jul. 28, 2022

(51) Int. Cl.
*G06V 20/40* (2022.01)
*G06F 1/16* (2006.01)
(Continued)

(52) U.S. Cl.
CPC .............. *G06V 20/41* (2022.01); *G06F 1/163* (2013.01); *G06F 18/214* (2023.01); *G06V 20/20* (2022.01)

(58) Field of Classification Search
CPC ........ G06V 20/41; G06V 20/20; G06F 1/163; G06K 9/6256
See application file for complete search history.

(56) References Cited

U.S. PATENT DOCUMENTS 11,163,999 B2 * 11/2021 Arshad ................. G10L 15/22
2015/0286976 A1    10/2015 Hirschfeld et al.
(Continued)

OTHER PUBLICATIONS

Funk et al. HoloCollab: a shared virtual platform for physical assembly training using spatially-aware head-mounted displays. Oct. 22, 2017 (Oct. 22, 2017) [retrieved on Feb. 18, 2022]. Retrieved from the Internet: < URL:https://dl.acm.org/doi/pdf/10.1145/3131542.3131559> entire document.
(Continued)

*Primary Examiner* — Md K Talukder

(57) ABSTRACT

An operation management system is disclosed. The operation management system may receive a video stream from a wearable device of a user that is performing an operation in a physical environment. The operation management system may process, using an operation performance model, a set of frames of the video stream that indicates a state of a performance of the operation by the user. The operation management system may determine, based on the state of the performance by the user, a next task of the operation. The operation management system may configure display data that is associated with a physical object that is associated with the next task. The display data may be associated with an indicator that identifies the physical object and/or task information associated with performing the next task. The operation management system may provide the display data to the wearable device.

20 Claims, 7 Drawing Sheets

(51) Int. Cl.
*G06V 20/20* (2022.01)
*G06F 18/214* (2023.01)

(56) References Cited

U.S. PATENT DOCUMENTS

| | | | |
|---|---|---|---|
| 2017/0280188 A1* | 9/2017 | Mullins | H04N 21/242 |
| 2018/0365497 A1 | 12/2018 | Balasundaram et al. | |
| 2019/0033914 A1* | 1/2019 | Aimone | A61B 5/6821 |
| 2020/0394012 A1* | 12/2020 | Wright, Jr. | G06K 9/6201 |
| 2021/0192972 A1 | 6/2021 | Acharya et al. | |
| 2021/0334547 A1* | 10/2021 | Cohen-Tidhar | G06V 10/82 |
| 2022/0222470 A1* | 7/2022 | Hropak | G06N 3/0454 |
| 2022/0237399 A1* | 7/2022 | Kowalski | G06K 9/6256 |

OTHER PUBLICATIONS

Kudo. A Proposal for Article Management Method Using Wearable Camera. Dec. 31, 2020 (Dec. 31, 2020). [retrieved on Feb. 18, 2022]. Retrieved from the Internet: <URL:https://www.sciencedirect.com/science/article/pll/S1877050920320433> pp. 1338-1347.

Stiefmeier et al. Wearable Activity Tracking in Car Manufacturing. Apr. 11, 2008 (Apr. 11, 2008). [retrieved on Feb. 15, 2022]. Retrieved from the Internet: < URL:https://ieeexplore.ieee.org/document/4487087> pp. 42-50.

International Search Report and Written Opinion for International Application No. PCT/US2021/064515 dated Mar. 11, 2022.

\* cited by examiner

OPERATION MANAGEMENT SYSTEM UTILIZING A WEARABLE DEVICE

BACKGROUND

"Augmented reality" (AR) may refer to a live view of a physical (real-world) environment that is modified by a computing device to enhance an individual's current perception of reality. The computing device may be a wearable AR device, such as smart glasses or other type of headset. During use of a wearable AR device, elements of the physical environment are "augmented" on a display device by computer-generated or extracted input, such as sound, video, graphics, haptics, informative text, and/or messages, among other examples.

Augmented reality may be used to provide indicators and/or information about the physical environment and/or provide instruction(s) to a user of a wearable AR device. Accordingly, there is a need to identify which indicators and/or information is to be presented on the display device relative to the physical environment and/or context associated with the user.

SUMMARY

In some implementations, a method of facilitating performance of an operation using a wearable device includes receiving a video stream from the wearable device; determining that the video stream is associated with a user of the wearable device, wherein the user is performing an operation in a physical environment; processing, using an operation performance model, a set of frames of the video stream that indicates a state of a performance of the operation by the user, wherein the operation performance model is trained based on a plurality of historical videos of historical performances of the operation by other users of other wearable devices, wherein the plurality of historical videos are captured by the other wearable devices; determining, based on the state of the performance by the user, a next task of the operation; identifying, using the operation performance model, a physical object within the physical environment that is depicted in the set of frames; determining, based on reference image data associated with the operation, that the physical object is associated with the next task; configuring display data that is associated with the physical object and that is associated with the next task, wherein the display data is associated with an indicator that identifies the physical object and task information associated with performing the next task; and providing the display data to the wearable device.

In some implementations, a device includes one or more memories and one or more processors, communicatively coupled to the one or more memories, configured to: receive a video stream from a wearable device associated with a user; determine that the video stream is associated with the user performing an operation in a physical environment; determine, using an operation performance model, a state of a performance of the operation by the user, wherein the state of the performance is determined based on the operation performance model processing a set of frames of the video stream that depicts the state of the performance of the operation by the user; determine, based on the state of the performance by the user, a next task of the operation; identify, using the operation performance model, a physical object depicted in the set of frames that is associated with the next task; generate display data that is associated with the physical object and performance of the next task of the operation; and provide the display data to the wearable device.

In some implementations, a wearable device comprises: a camera; a display device; and a controller that is configured to: receive, from the camera, a video stream that depicts a user performing an operation; process, using an operation performance model, a set of frames of the video stream that indicates a state of a performance of the operation by the user, wherein the operation performance model is trained based on a plurality of historical videos of historical performances of the operation by other users; determine, based on the state of the performance by the user, a next task of the operation; obtain task information associated with performance of the next task of the operation; and cause, based on the task information, the display device to present instructional information associated with facilitating performance of the next task of the operation.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate implementations of concepts disclosed herein, and explain various principles and advantages of those implementations.

Figure 1:
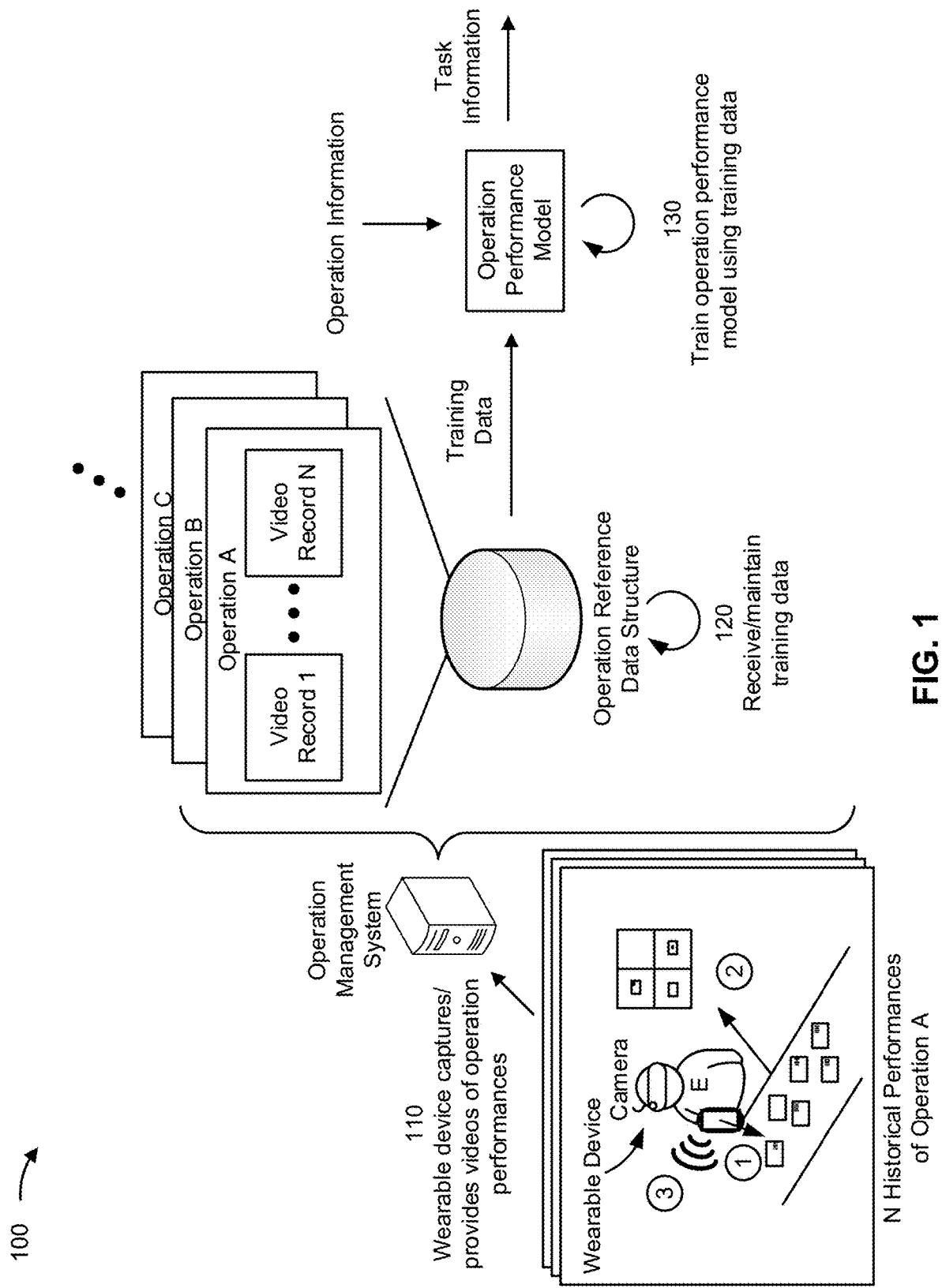
FIG. 1 is a diagram of an example implementation associated with an example operation management system that involves a wearable device described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations described herein.

The apparatus and method elements have been represented where appropriate by conventional symbols in the drawings, showing only those specific details that are pertinent to understanding the implementations described herein so as not to obscure the disclosure with details that will be readily apparent to those of ordinary skill in the art having the benefit of the description herein.

DETAILED DESCRIPTION

The following detailed description of example implementations refers to the accompanying drawings. The same reference numbers in different drawings may identify the same or similar elements.

In many cases, a worker (e.g., a new or relatively inexperienced individual) needs to be trained on operations involved in taking on a particular role. Typically, an expert (e.g., a relatively experienced worker or supervisor) associated with the role trains the worker through in-person training. However, an expert may be unable to provide in-person training in certain instances for various reasons (e.g., due to a physical distance between the expert and the worker and/or due to health conditions/social distancing requirements, among other examples). While an expert can remotely train a worker via voice calls, video conferencing, or other types of meeting platforms, such training typically involves static instruction and/or use of preconfigured training materials. These static instructions and/or preconfigured training materials may not consider and/or allow a worker to address certain issues (e.g., relatively rare or unique problems) that can arise during a performance of an operation, especially if the worker is relatively inexperienced (e.g., because the worker may not have the knowledge or experience to problem solve the issues).

Evolution of technology or other processes involved in the role can permit experienced workers (or experts) to identify more efficient procedures to perform certain tasks of operations than the procedures described in static instructions or preconfigured training materials. Because static instructions or preconfigured training materials are periodically updated, or experienced workers do not proactively update the static instructions or preconfigured training materials, the more efficient procedures may not be conveyed to inexperienced workers until the materials are updated. As a result, inexperienced workers may waste time and/or resources (e.g., human resources and/or computing resources, such as memory resources, processing resources, and/or power resources) by inefficiently performing the operation according to the static instructions or preconfigured training materials. Therefore, there is a need for a system that identifies changes to performing tasks, relative to the static instructions and/or preconfigured training materials, that can improve a performance of an operation (e.g., changes to which tasks are be performed for an operation and/or changes to an order of tasks that an individual is to perform during the operation). Correspondingly, there is a need to identify a more optimal (e.g., a more efficient and/or a faster) way to perform an operation than what is described in the static instructions or preconfigured training materials. Furthermore, there is a need to dynamically be able to provide the identified changes to a worker (whether a relatively inexperienced worker or an experienced worker so as to prevent the inexperienced worker from inefficiently performing an operation.

Some implementations described herein provide an operation management system that utilizes a wearable device (e.g., an AR or Head's Up Display (HUD) device) to dynamically identify tasks for performing an operation and/or provide display data to the wearable device to permit a user of the wearable device to be dynamically trained (e.g., in real-time) while performing the operation. In some implementations, the operation management system may utilize a model (e.g., an artificial intelligence model, a deep learning model, and/or a machine learning model) to identify a workflow associated with performing an operation. For example, the model may identify and/or learn tasks performed by an individual (e.g., a worker and/or an expert) from video streams provided by the wearable devices. Based on the video streams, the model may be trained to identify the tasks and/or physical objects in an operation (e.g., equipment, tools, products, and/or other items associated with the operation). Accordingly, the operation management system may use the trained model to provide task information to a relatively inexperienced worker (e.g., a user wearing a same or similar wearable device that was used to train the model) and/or to point out a physical object in a physical environment of the inexperienced worker, to facilitate more efficient performance of the operation by the inexperienced worker and/or to train the inexperienced worker (e.g., automatically and/or without real-time expert assistance).

In this way, as described herein, an operation management system may utilize a wearable device and/or a model to identify a next task (e.g., a next best action) that is to be performed by a worker during an operation and provide task information and/or an indicator (e.g., via a display device of the wearable device) associated with a physical object involved in performance of the next task. Accordingly, the operation management system facilitates more efficient performance of operations than other systems or wearable devices that do not utilize the model or wearable device as described herein.

Figure 2:
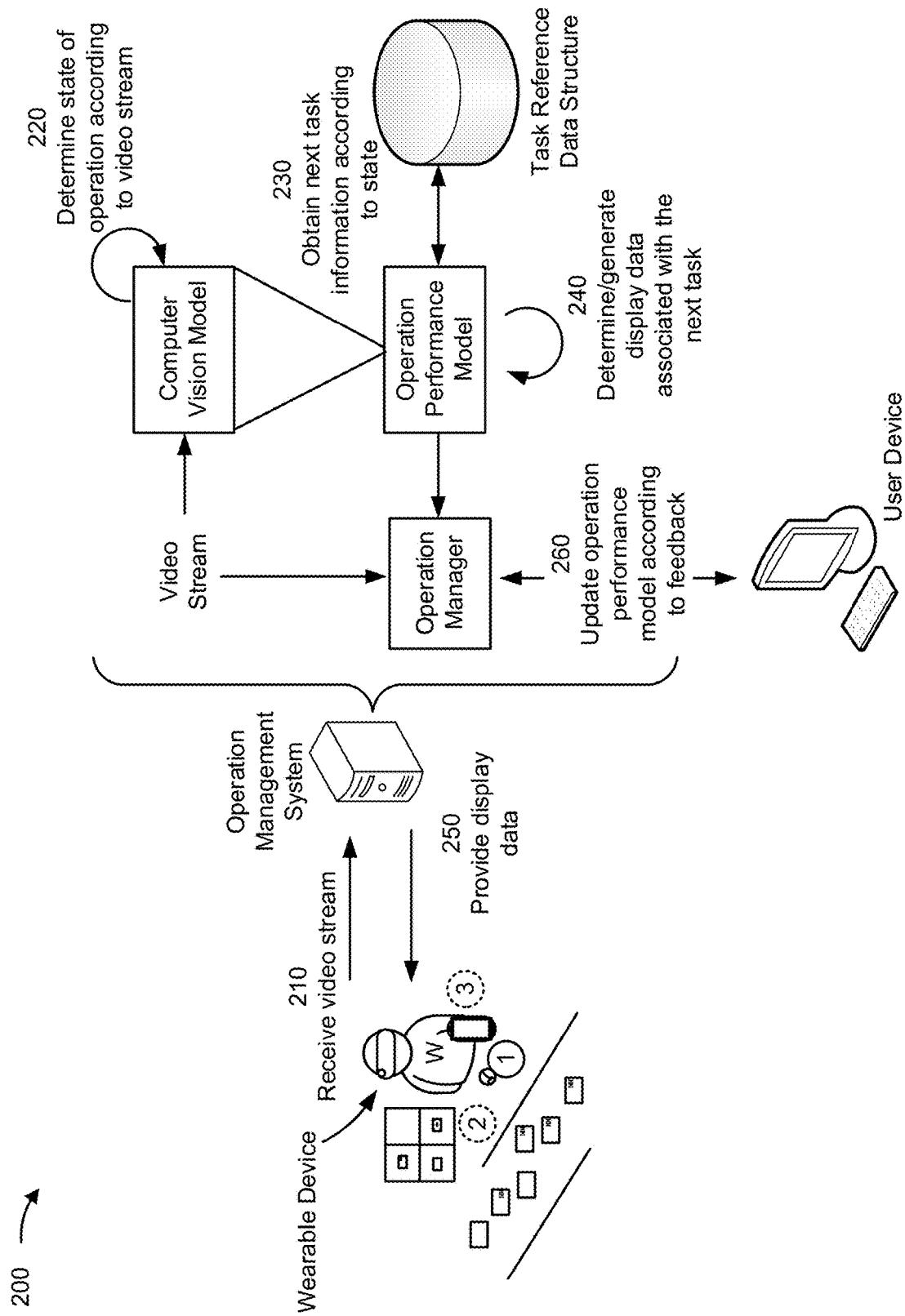
FIG. 2 is a diagram of another example implementation described herein.

FIGS. 1-2 are diagrams of one or more example implementations associated with an operation management system utilizing a wearable device, as described herein. As shown in FIG. 1, an example implementation 100 includes an operation management system and a wearable device. These devices are described in more detail below in connection with FIG. 4 and FIG. 5. In example implementation 100, an operation performance model of the operation management system is trained based on historical performances of operations by users (e.g., experts or other experienced users) to permit the operation performance model to be used to provide display data (e.g., AR data or head's up display (HUD) display data) to a user as described in connection with example implementation 200 in FIG. 2.

As shown in FIG. 1, and by reference number 110, a wearable device captures and provides videos of operation performances. The videos correspond to historical videos of multiple historical performances (N historical performances, where N>1) of an operation (Operation A) by a user (User E).

The wearable device may include a head-mounted device that includes a camera. Accordingly, the videos may be captured from the perspective of User E (e.g., because a field of view of the camera may correspond to a field of view of User E). In some implementations, the historical performances of Operation A may be performed by multiple users (e.g., users that have a same or similar amount of experience as User E) using multiple wearable devices. In such a case, the multiple wearable devices may be a same type of wearable device or a similar type of wearable device (e.g., head-mounted wearable devices and/or wearable devices that capture video from a similar user perspective).

In example implementation 100, Operation A may involve User E performing a repair of a board (e.g., a circuit panel or control panel). Accordingly, Operation A may involve three tasks, labeled 1, 2, and 3. For example, task 1 of Operation A may involve User E scanning an object (e.g., a component or part) using a scanner, task 2 of Operation A may involve installing the object on the board, and task 3 of Operation A may involve causing the scanner to transmit information associated with the object being installed. The individual videos may depict User E iteratively performing the three tasks to complete the operation. Additionally, or alternatively, each of the videos may include a single iteration of performing the three tasks to complete the operation.

As an example, User E may be a relatively experienced user or expert with a level of knowledge that enables User E to independently identify ways to improve a performance of the operation over a historical period of time (e.g., based on updates to technology, changes in related processes, and/or the like). Accordingly, User E may perform the individual tasks of Operation A in various ways. For example, User E may perform different subtasks to perform a task, perform certain subtasks of a task in a different sequence, and/or perform a subtask of one task between subtasks of another task. As a more specific example, one historical performance of the operation may include iteratively scanning a first object, installing the first object, and transmitting information associated with the first object, then scanning a second object, installing a second object, and transmitting information associated with the second object, and so on, until the operation is complete for all objects. As another example, the objects may be associated with a kit (e.g., a repair kit to repair the board). Accordingly, an order of scanning the objects, installing the objects, and transmitting information associated with the objects can be different between historical performances (e.g., User E may try various sequences of processing the objects in the kit). Another historical performance of the operation may include batch processing the objects by scanning all objects, installing all objects, and transmitting information for all objects.

In some implementations, the video is provided to the operation management system along with information associated with the historical performances. For example, the wearable device may provide metadata associated with the video. The metadata may include a user identifier that identifies a user (e.g., a name of User E, a user credential, and/or an identification (ID) number, such as an employee ID or member ID) and/or a device identifier that identifies the wearable device (e.g., a serial number of the wearable device, an Internet protocol (IP) address, and/or a media-access control (MAC) address, among other examples). Additionally, or alternatively, the metadata may include a timestamp associated with the video, which may correspond to a date and/or time of the historical performances.

As further shown in FIG. 1, and by reference number 120, the operation management system receives and/or maintains training data for training the operation performance model. For example, the operation management system may store the training data within an operation reference data structure. The operation reference structure may include any suitable data structure, such as a database, an index, a graph, and/or the like. The training data may include the videos of historical performances and corresponding metadata associated with the videos.

In some implementations, the operation reference data structure may store the training data associated with a plurality of operations (e.g., a plurality of operations performed by different types of workers of an organization associated with the operation management system). More specifically, training data for Operation A may include N videos associated with the N historical performances that were captured and/or provided by User E (and/or the wearable device(s) of User F). Additionally, or alternatively, the training data for Operation A may include corresponding sets of metadata associated with the N videos.

In some implementations, the training data may identify the operation and/or tasks associated with the operation. For example, as shown, the wearable device may indicate or identify the operation that is being performed. For example, User E or another individual (e.g., a managing user associated with the operation management system) may indicate that the video is associated with performance of the operation.

As further shown in FIG. 1, and by reference number 130, the operation management system trains the operation performance model using the training data. For example, the operation management system may train the operation performance model based on the videos of the historical performances and/or metadata associated with the videos. Additionally, or alternatively, the operation management system may train the operation performance model based on received operation information. The operation information may be received and/or provided via a user input (e.g., using a supervised learning technique) and/or another system (e.g., using an unsupervised learning technique and/or a deep learning technique).

The operation performance model may be associated with a machine learning model (e.g., a neural network, a clustering model, a prediction model, and/or a generator model). More specifically, the operation management system may use a computer vision model (e.g., a convolutional neural network) to classify the training data (e.g., video relating to certain tasks of a particular operation and/or video relating to certain operations) into a particular class (e.g., a class indicating that the video is associated with a first operation, a class indicating that the video is associated with a second operation, and/or the like). In some cases, the computer vision model may utilize an image recognition technique (e.g., an Inception framework, a ResNet framework, a Visual Geometry Group (VGG) framework, and/or the like), an object detection technique (e.g., a Single Shot Detector (SSD) framework, a You Only Look Once (YOLO) framework, and/or the like), an object in motion technique (e.g., an optical flow framework and/or the like), and/or the like.

Accordingly, the machine learning model may be trained to identify performance of a particular operation and/or tasks of an operation. For example, the operation management system may train the machine learning model based on historical videos (e.g., videos that are stored in the operation reference data structure) associated with User E and/or multiple other users performing one or more operations. In some implementations, the operation management system may train the machine learning model based on one or more sets of frames of the historical videos that correspond to individual tasks (or subtasks) of the operation. In some implementations, the operation performance model may be trained to identify (e.g., using a computer vision model) patterns and/or trends associated with performance of tasks of an operation depicted in the videos (e.g., based on timestamp data and/or other metadata associated with the videos). Additionally, or alternatively, the operation performance model may be trained to identify (e.g., using a computer vision model) patterns or trends of utilizing and/or interacting with certain physical objects during performance of one or more tasks of an operation.

The operation performance model may learn and/or maintain task information for a task of an operation that identifies elements (e.g., physical objects and/or locations of a physical environment) and/or activities involved in the task. Accordingly, the task information for task 1 of Operation A may identify use of a scanner and a scan of an object, task information for task 2 of Operation A may identify installation of the object on the board (and/or a location of the board), and task information for task 3 of Operation A may identify actions involving causing the scanner to transmit information associated with installation of the object on the board.

In some implementations, the operation management system may receive the operation performance model from another system after the operation management system is trained. For example, the other system may obtain the videos of historical performances of Operation A and/or operation information associated with Operation A and provide the operation performance model to the operation management system to permit the operation management system to utilize the operation performance model. Additionally, or alternatively, the operation performance model may be configured to be locally installed on a wearable device for use, as described elsewhere herein. The operation performance model may be trained and/or utilized as described in more detail in connection with FIG. 3.

In example implementation 200 of FIG. 2, the operation management system (and/or a wearable device) uses the operation performance model to facilitate a performance of an operation as described herein. As shown in FIG. 2, and by reference number 210, the operation management system receives a video stream from a camera of a wearable device. A user (User W) of the wearable device may be performing the operation (Operation A) within a physical environment. Accordingly, the video stream may be a live stream that depicts, nearly in real-time, User W's performance of Operation A within the physical environment. In some implementations, the operation management system may receive the video stream based on a user input to the wearable device from User W (e.g., in association with a request for assistance with performance of Operation A).

In example implementation 200, User W wears the wearable device as a head-mounted device, similar to the wearable device(s) of example implementation 100. For example, the wearable device may include a heads-up display device, smart glasses, and/or the like. In some implementations, the wearable device may include a display device that is configured to present video of the performance operation to User W. For example, the display device may be positioned between User W's eyes and a camera. The camera may be positioned within the wearable device to have a center of field of view that aligns with a field of view of the user's eyes. Accordingly, the displayed video stream from the camera provides, to the user, a digitized view of the physical environment. In this way, the wearable device may capture and/or obtain video from a perspective of User W (e.g., such that a field of view of the camera corresponds to or is based on a field of view of User W) in a similar manner as the wearable device of example implementation 100 that captured historical performances of Operation A from a perspective of User E.

In some implementations, the wearable device may utilize spatial locationing and/or may utilize a spatial locator (e.g., a locationing system of an AR device and/or virtual reality (VR) device outfitted with such technology) to identify spatial relationships between the wearable device and physical objects and/or reference points (e.g., point clouds and/or reference objects) within the physical environment. Furthermore, the wearable device may provide spatial location information (e.g., from the spatial locator) to the operation management system to indicate a location and/or an orientation of the wearable device. The spatial location information may be provided as metadata along with frames of the video. Accordingly, the operation management system may interpret or determine the location of the wearable device (and/or User W) at a time that a frame of the video stream is captured.

In some implementations, based on receiving the video stream, the operation management system may determine that the video stream is associated with a particular user (User W) and/or determine that the video stream is associated with performance of a particular operation. For example, the operation management system may utilize a task manager that maintains one or more operation mappings associated with performance of one or more operations (e.g., one or more operations that are being performed by workers of an organization associated with the operation management system). The operation mapping may include any suitable data structure that maps operations to one or more parameters that may be associated with a video stream, a wearable device, and/or a user of the wearable device. For example, the one or more parameters may include an identifier (e.g., a user identifier associated with User W and/or a device identifier associated with the wearable device), a location of the wearable device and/or a physical environment depicted in the video stream, and/or a physical object depicted in the video stream (e.g., one or more of the objects, the scanner and/or the board may be associated with Operation A based on being used in tasks involving Operation A). Accordingly, the operation management system may determine that the video stream is associated with a particular operation, based on an identifier received in association with the video stream, a location indicated by the wearable device (e.g., according to the spatial locator), and/or a depicted object in the video stream.

As further shown in FIG. 2 and by reference number 220, the operation management system determines a state of an operation according to the video stream. For example, as shown, the operation management system, using a computer vision model of the operation performance model, may process a set of frames of the video stream (e.g. frames from a most recent sliding window of the video stream) to determine which task of Operation A has recently been performed by User W. More specifically, the operation performance model may indicate the state of the operation as "task 1 complete" or "between task 1 and task 2" based on processing a set of frames depicting User W using the scanner to scan an object (e.g., a barcode on an object) in the physical environment (e.g., because the videos of the historical performances similarly depicted User E performing task 1 in a similar manner). Accordingly, the set of frames and/or the operation performance model may indicate the state of the performance of the operation based on the operation performance model being previously trained according to historical videos depicting similar performance tasks of Operation A.

As further shown in FIG. 2, and by reference number 230, the operation management system obtains next task information according to the state. For example, as shown, the operation management system may maintain task information (e.g., task information learned during the training described in connection with FIG. 1 and/or FIG. 3) in a task reference data structure. The task reference data structure may include any suitable data structure that maps states of an operation to tasks and/or next tasks of the operation that are to be performed. The next task may correspond to a next best task that the operation performance model learned and/or identified as a next best task that User W is to perform to efficiently perform Operation A and/or efficiently complete the performance of Operation A from the standpoint of the determined state (e.g., as learned based on identified durations of the historical performances and/or determined efficiency metrics associated with the historical performances).

As further shown in FIG. 2, and by reference number 240, the operation management system determines and/or generates display data associated with the next task. The display data and/or information associated with the display data may be mapped to the next task in the task reference data structure. The display data may be generated and/or configured to cause the wearable device to present (e.g., embed and/or overlay) task information on the display device of the wearable device. For example, the display data may include or be associated with instructions for performing the next task (e.g., relative to the physical object). The display data may include a message or other text that is to be presented via the display device of the wearable device that instructs User W on how to perform the next task (e.g., in order to efficiently complete Operation A).

Additionally, or alternatively, the display data may be an image or other media. For example, the display data may be configured to indicate a physical object (e.g., by presenting a reference image of the physical object) that is used in association with performing the next task (e.g., to permit User W to search for and/or locate the physical object). In some implementations, the task reference data structure may include a mapping of one or more reference images to corresponding tasks of an operation (e.g., Operation A). For example, the reference images may depict reference objects that are utilized and/or involved in a corresponding task. Accordingly, based on the video stream depicting a particular physical object, the operation performance model may determine and/or indicate a location of the particular physical object so that a user of the wearable device can quickly locate the physical object in association with performing the next task.

In some implementations, the task reference data structure may map reference image data associated with an operation (e.g., Operation A) to corresponding tasks of the operation. For example, the reference image data may depict reference objects that are utilized and/or involved in a corresponding task. Accordingly, based on image data of a frame of the video stream corresponding to reference image data of a reference object (e.g., indicating that the video stream depicted a particular physical object that corresponds to one or more of the reference objects), the operation performance model may determine and/or indicate the particular physical object (and/or a location of the physical object identified in the task reference data structure) so that a user of the wearable device can quickly locate the physical object in association with performing the next task.

In some implementations, the operation management system may configure the display data according to the type of wearable device. More specifically, if the wearable device is an AR device, the operation management system may configure the display data according to spatial location information received from the wearable device. In such a case, the operation management system can generate the display data to include locationing information associated with a location of a physical object involved in a next task. For example, the operation management system may identify a physical object depicted in the physical environment that is associated with performing the next task. More specifically, the operation management system, via the operation performance model, may analyze frames of the video stream to identify the physical object within the physical environment. The operation performance model may identify (e.g., using object detection and/or object recognition) the physical object based on a frame including a depiction that is similar to a reference image associated with the next task. Accordingly, based on a particular shape of the physical object (e.g., a shape included in a reference image that is mapped to the next task in the task reference data structure) being depicted within a frame of the video stream, the operation performance model may detect and/or indicate that a frame of the video stream depicts the physical object.

Furthermore, based on spatial information associated with a position (e.g., location and orientation) of the wearable device and a location of the physical object as depicted in the frame, the operation management system may generate the display data to indicate a location of the physical object relative to the position of the wearable device. For example, the operation management system may generate the display data to include an indication of a location of the physical object and/or an indicator that points out the physical object within the physical environment relative to the wearable device (and/or User W). For example, when the physical object is not within a field of view of a camera of the wearable device (e.g., User W is looking away from the physical object), the indicator may include an arrow that directs User W to turn toward and/or look toward the physical object. In such a case, once the physical object is within the field of view of the camera (and is depicted within the video frame), the indicator may include an overlay or highlight of the physical object to permit User W to quickly locate the physical object within the physical environment. In this way, the operation management system may generate display data that includes an AR indicator associated with a physical object that is used to perform the next task.

As further shown in FIG. 2, and by reference number 250, the operation management system provides the display data to the wearable device. The display data may be configured to cause the wearable device to present the task information for performing the next task of the operation in order to assist a user with performing the operation. In some implementations, using a spatial locator, the wearable device may be configured to determine and present the task information relative to a position of the wearable device. For example, the task information and/or an indicator of a physical object may be presented on the display relative to a location and/or orientation of the display device.

Accordingly, based on the received display data, the wearable device may be configured to present, on a display device, task information associated with facilitating performance of an operation. In some implementations, the operation management system may continue to monitor User W's performance of the operation until the operation management system determines that the last task of the operation was successfully performed by User W.

As further shown in FIG. 2, and by reference number 260, the operation management system may update the operation performance model according to feedback. In some implementations, a user device (e.g., associated with a supervisor) may provide feedback and/or information associated with assisting or facilitating performance of an operation by a user as described herein. The feedback may be utilized in association with a supervised learning technique to permit the operation performance model to dynamically be trained and/or updated.

In some implementations, the operation management system may monitor performance of the operation relative to the task information that is provided and presented on the display device of the wearable device. For example, the operation management system may continue to receive a video stream (e.g., in subsequent sets of frames) that includes the embedded instructions and/or indicators. Accordingly, the feedback may be interpreted from the performance of the next task according to provided instructions and/or interaction with an identified physical object. In some implementations, if the presented instructions and/or indicator are ignored by the user when continuing to perform the next task, the wearable device may request the user to provide (e.g., via a user interface) feedback associated with the instructions and/or indicator. The feedback may indicate whether the instructions were useful in performing the next task and/or whether the indicator accurately or inaccurately identified the physical object, among other examples. In this way, based on the feedback, the video stream, and the provided display data, the operation management system may update or retrain the operation performance model to provide continued and/or dynamic updating and/or training of the operation performance model. In this way, the operation performance model may be trained to more accurately identify a state of an operation, next tasks based on the state of the operation, and/or which physical objects are associated with certain tasks of the operation.

In some implementations, the operation management system continues to monitor performance of the operation until the operation is complete. Accordingly, after the operation management system detects that the next task identified above is completed by the user, the operation management system may determine that the state of the performance has advanced to a subsequent state, and/or that a corresponding subsequent task of the operation is to be performed as described herein. In some implementations, based on identifying a subsequent state of the performance of the operation, the operation management system may generate and/or provide a notification to the wearable device that task information and/or an indicator associated with the previously completed task is to be removed from the display device.

Additionally, or alternatively, the operation management system may be configured to track one or more metrics associated with User W's performance of tasks of the operation and/or one or more metrics associated with User W's performance of the operation. For example, such metrics may include speed and/or a quantity of resources consumed when performing certain tasks (or subtasks), to complete the operation, when performing tasks of the operation in a particular manner, and/or when performing the tasks of the operation in a particular sequence, among other examples.

In this way, the operation management system and/or wearable device described herein permits a user to receive onsite and/or on the job training without the need for in-person training by a supervisor or expert. Furthermore, training and using the operation performance model, as described herein, permits the operation management system to accurately and effectively identify tasks of an operation, identify physical objects involved in tasks of the operation, learn and/or detect relatively more efficient ways to perform the tasks, and/or determine instructions for assisting a user with performing and/or completing the tasks more efficiently.

As indicated above, FIGS. 1-2 are provided as an example. Other examples may differ from what is described with regard to FIGS. 1-2. The number and arrangement of devices shown in FIGS. 1-2 are provided as an example. In practice, there may be additional devices, fewer devices, different devices, or differently arranged devices than those shown in FIGS. 1-2. Furthermore, two or more devices shown in FIGS. 1-2 may be implemented within a single device, or a single device shown in FIGS. 1-2 may be implemented as multiple, distributed devices. Additionally, or alternatively, a set of devices (e.g., one or more devices) shown in FIGS. 1-2 may perform one or more functions described as being performed by another set of devices shown in FIGS. 1-2. For example, although example functions described above in connection with FIGS. 1 and 2 may be described as being performed by the operation management system, one or more of the example functions may similarly be performed by a wearable device or other device associated with the operation management system.

Figure 3:
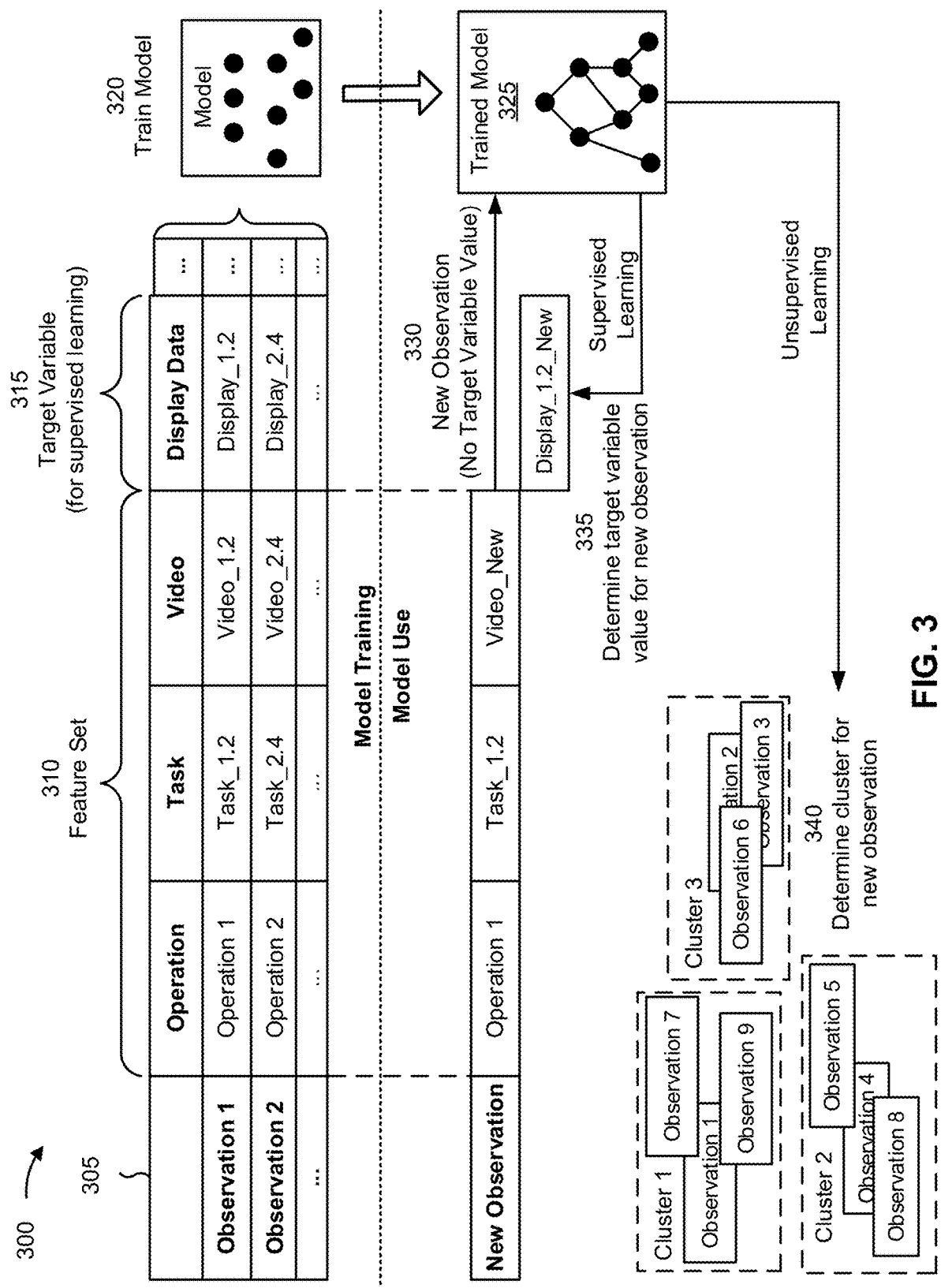
FIG. 3 is a diagram of an example of training and using a machine learning model in connection with an operation management system that involves use of a wearable device.

FIG. 3 is a diagram illustrating an example 300 of training and using a machine learning model in connection with an operation management system that involves use of a wearable device. The machine learning model training and usage described herein may be performed using a machine learning system. The machine learning system may include or may be included in a computing device, a server, a cloud computing environment, or the like, such as an operation management system, a wearable device, and/or a user device described in more detail elsewhere herein.

As shown by reference number 305, a machine learning model may be trained using a set of observations. The set of observations may be obtained from training data (e.g., historical data), such as data gathered during one or more processes described herein. In some implementations, the machine learning system may receive the set of observations (e.g., as input) from one or more wearable devices, as described elsewhere herein.

As shown by reference number 310, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the one or more wearable devices. For example, the machine learning system may identify a feature set (e.g., one or more features and/or feature values) by extracting the feature set from structured data, by performing natural language processing to extract the feature set from unstructured data, and/or by receiving input from an operator.

As an example, a feature set for a set of observations may include a first feature of an operation, a second feature of a task, a third feature of a video, and so on. As shown, for a first observation, the first feature may have a value of Operation 1 (e.g., corresponding to an identifier of an operation involved in a first, Observation 1), the second feature may have a value of Task 12 (e.g., corresponding to an identifier of a task of the operation involved in the first observation), the third feature may have a value of Video_1.2 (e.g., corresponding to video data of a video associated with performance of the task of the first observation), and so on. These features and feature values are provided as examples and may differ in other examples. For example, the feature set may include one or more of the following features: a type of the operation, a type of the task, whether a task involves a reference object, a type of the reference object involved in a task, a duration of a period of time associated with the video, an identifier of a user that performed the task, a type of device used to capture the video, and/or other metadata associated with the video.

As shown by reference number 315, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiples classes, classifications, or labels) and/or may represent a variable having a Boolean value. A target variable may be associated with a target variable value, and a target variable value may be specific to an observation. In example 300, the target variable is display data (corresponding to instructions and/or an indicator that is to be displayed to facilitate performance of tasks of the observations), which has a value of Display_1.2 for the first observation (e.g., corresponding to display data that was selected for display in association with performing the task of the first observation).

The feature set and target variable described above are provided as examples, and other examples may differ from what is described above. For example, for a target variable of whether a physical object is used for a task, the feature set may include the operation, the task information, the video, and/or reference image data associated with reference objects of the task.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 320, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, or the like. After training, the machine learning system may store the machine learning model as a trained machine learning model 325 to be used to analyze new observations.

As shown by reference number 330, the machine learning system may apply the trained machine learning model 325 to a new observation, such as by receiving a new observation and inputting the new observation to the trained machine learning model 325. As shown, the new observation may include a first feature of Operation 1 (e.g., corresponding to the operation from the first observation), a second feature of Task_1.2 (e.g., corresponding to the task from the first observation), a third feature of Video_New (e.g., corresponding to video of the task of the new observation), and so on, as an example. The machine learning system may apply the trained machine learning model 325 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs and/or information that indicates a degree of similarity between the new observation and one or more other observations, such as when unsupervised learning is employed.

As an example, the trained machine learning model 325 may predict a value of Display_1.2_New (e.g., corresponding to a customized version of the display data from the first observation that is based on specifics of the new observation) for the target variable of Display Data for the new observation, as shown by reference number 335. Based on this prediction, the machine learning system may provide a first recommendation, may provide output for determination of a first recommendation, may perform a first automated action, and/or may cause a first automated action to be performed (e.g., by instructing another device to perform the automated action), among other examples. The first recommendation may include, for example, a suggestion to indicate or provide a particular instruction and/or to indicate a particular physical object associated with performing a task. The first automated action may include, for example, causing a display to present a particular instruction and/or to identify a location of a physical object associated with performing the task, as described elsewhere herein.

In some implementations, the trained machine learning model 325 may classify (e.g., cluster) the new observation in a cluster, as shown by reference number 340. The observations within a cluster may have a threshold degree of similarity. As an example, if the machine learning system classifies the new observation in a first cluster (e.g., a cluster associated with a first task of an operation), then the machine learning system may provide a first recommendation, such as the first recommendation described above. Additionally, or alternatively, the machine learning system may perform a first automated action and/or may cause a first automated action to be performed (e.g., by instructing another device to perform the automated action) based on classifying the new observation in the first cluster, such as the first automated action described above.

As another example, if the machine learning system were to classify the new observation in a second cluster (e.g., a cluster associated with a second task of the operation), then the machine learning system may provide a second (e.g., different) recommendation (e.g., a suggestion of presenting different instructions and/or a suggestion to use a different physical object) and/or may perform or cause performance of a second (e.g., different) automated action, such as presenting the different instructions and/or pointing out the different physical object.

In some implementations, the recommendation and/or the automated action associated with the new observation may be based on a target variable value having a particular label (e.g., classification or categorization), may be based on whether a target variable value satisfies one or more threshold (e.g., whether the target variable value is greater than a threshold, is less than a threshold, is equal to a threshold, falls within a range of threshold values, or the like), and/or may be based on a cluster in which the new observation is classified.

In this way, the machine learning system may apply a rigorous and automated process to facilitating and/or managing performance of an operation. The machine learning system enables recognition and/or identification of tens, hundreds, thousands, or millions of features and/or feature values for tens, hundreds, thousands, or millions of observations, thereby increasing accuracy and consistency and reducing delay associated with facilitating and/or managing performance of an operation relative to requiring computing resources to be allocated for tens, hundreds, or thousands of operators to manually facilitating and/or managing performance of an operation using the features or feature values.

As indicated above, FIG. 3 is provided as an example. Other examples may differ from what is described in connection with FIG. 3.

Figure 4:
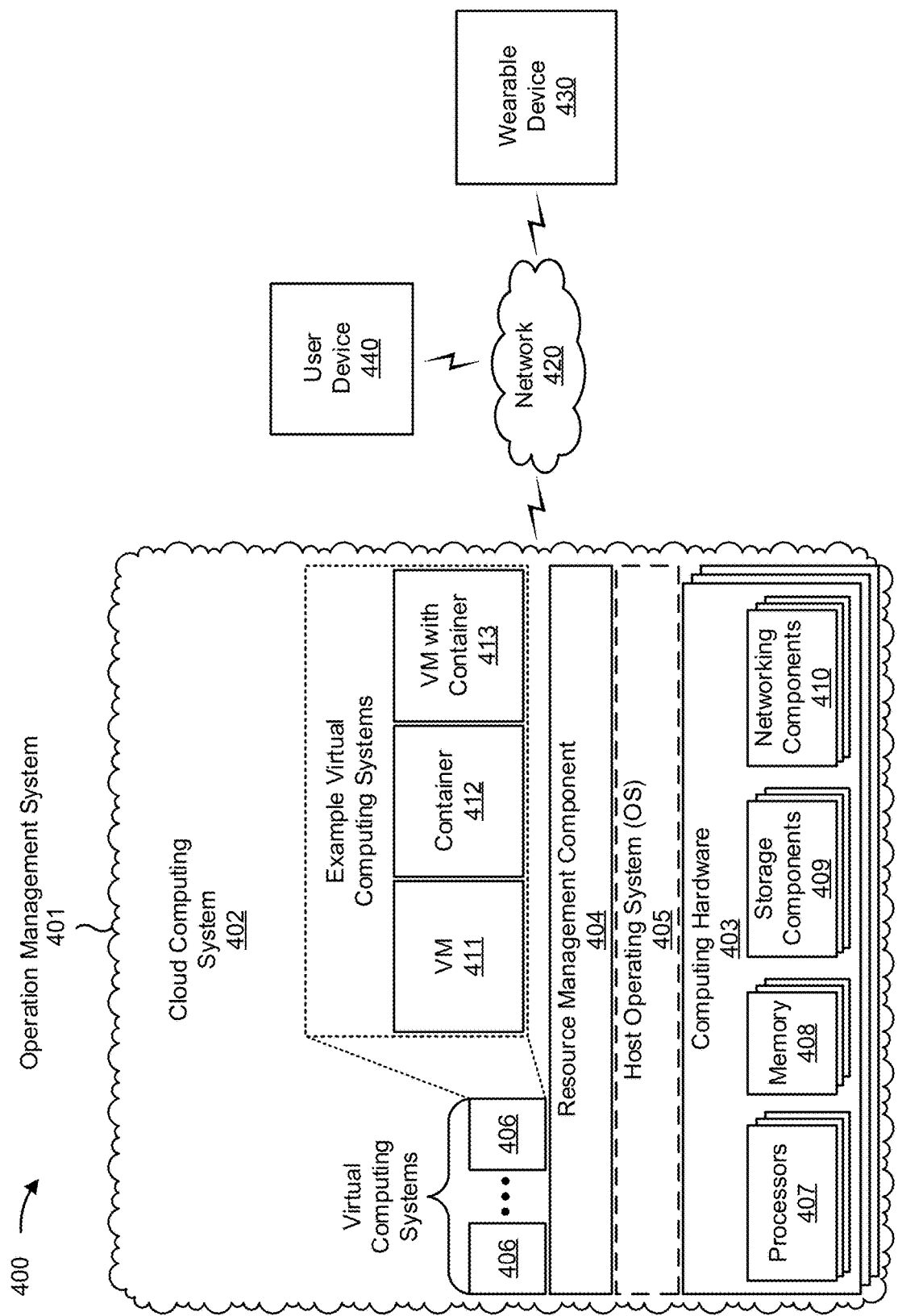
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include an operation management system 401, which may include one or more elements of and/or may execute within a cloud computing system 402. The cloud computing system 402 may include one or more elements 403-413, as described in more detail below. As further shown in FIG. 4, environment 400 may include a network 420, a wearable device 430 and/or a user device 440. Devices and/or elements of environment 400 may interconnect via wired connections and/or wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using virtualization, the resource management component 404 enables a single computing device (e.g., a computer or a server) to operate like multiple computing devices, such as by creating multiple isolated virtual computing systems 406 from computing hardware 403 of the single computing device. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server) or from multiple computing devices (e.g., multiple servers), such as multiple computing devices in one or more data centers. As shown, computing hardware 403 may include one or more processors 407, one or more memories 408, one or more storage components 409, and/or one or more networking components 410. Examples of a processor, a memory, a storage component, and a networking component (e.g., a communication component) are described elsewhere herein.

The resource management component 404 includes a virtualization application (e.g., executing on hardware, such as computing hardware 403) capable of virtualizing computing hardware 403 to start, stop, and/or manage one or more virtual computing systems 406. For example, the resource management component 404 may include a hypervisor (e.g., a bare-metal or Type 1 hypervisor, a hosted or Type 2 hypervisor, or another type of hypervisor) or a virtual machine monitor, such as when the virtual computing systems 406 are virtual machines 411. Additionally, or alternatively, the resource management component 404 may include a container manager, such as when the virtual computing systems 406 are containers 412. In some implementations, the resource management component 404 executes within and/or in coordination with a host operating system 405.

A virtual computing system 406 includes a virtual environment that enables cloud-based execution of operations and/or processes described herein using computing hardware 403. As shown, a virtual computing system 406 may include a virtual machine 411, a container 412, or a hybrid environment 413 that includes a virtual machine and a container, among other examples. A virtual computing system 406 may execute one or more applications using a file system that includes binary files, software libraries, and/or other resources required to execute applications on a guest operating system (e.g., within the virtual computing system 406) or the host operating system 405.

Although the operation management system 401 may include one or more elements 403-413 of the cloud computing system 402, may execute within the cloud computing system 402, and/or may be hosted within the cloud computing system 402, in some implementations, the operation management system 401 may not be cloud-based (e.g., may be implemented outside of a cloud computing system) or may be partially cloud-based. For example, the operation management system 401 may include one or more devices that are not part of the cloud computing system 402, such as device 300 of FIG. 3, which may include a standalone server or another type of computing device. The operation management system 401 may perform one or more operations and/or processes described in more detail elsewhere herein.

Network 420 includes one or more wired and/or wireless networks. For example, network 420 may include a cellular network, a public land mobile network (PLMN), a local area network (LAN), a wide area network (WAN), a private network, the Internet, and/or a combination of these or other types of networks. The network 420 enables communication among the devices of environment 400.

The wearable device 430 may include one or more devices capable of receiving, generating, storing, processing, and/or providing information associated with facilitating and/or managing performance of an operation, as described elsewhere herein. The wearable device 430 may include a communication device and/or a computing device. For example, the wearable device 430 may include a pair of smart eyeglasses, a head mounted display, or an AR headset, a VR headset, or a similar type of device.

The user device 440 includes one or more devices capable of receiving, generating, storing, processing, and/or providing information associated with a user managing a performance of an operation, as described elsewhere herein. The user device 440 may include a communication device and/or a computing device. For example, the user device 440 may include a wireless communication device, a mobile phone, a user equipment, a laptop computer, a tablet computer, a desktop computer, wearable communication device (e.g., a smart wristwatch, a pair of smart eyeglasses, a head mounted display, or a virtual reality headset), or a similar type of device.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
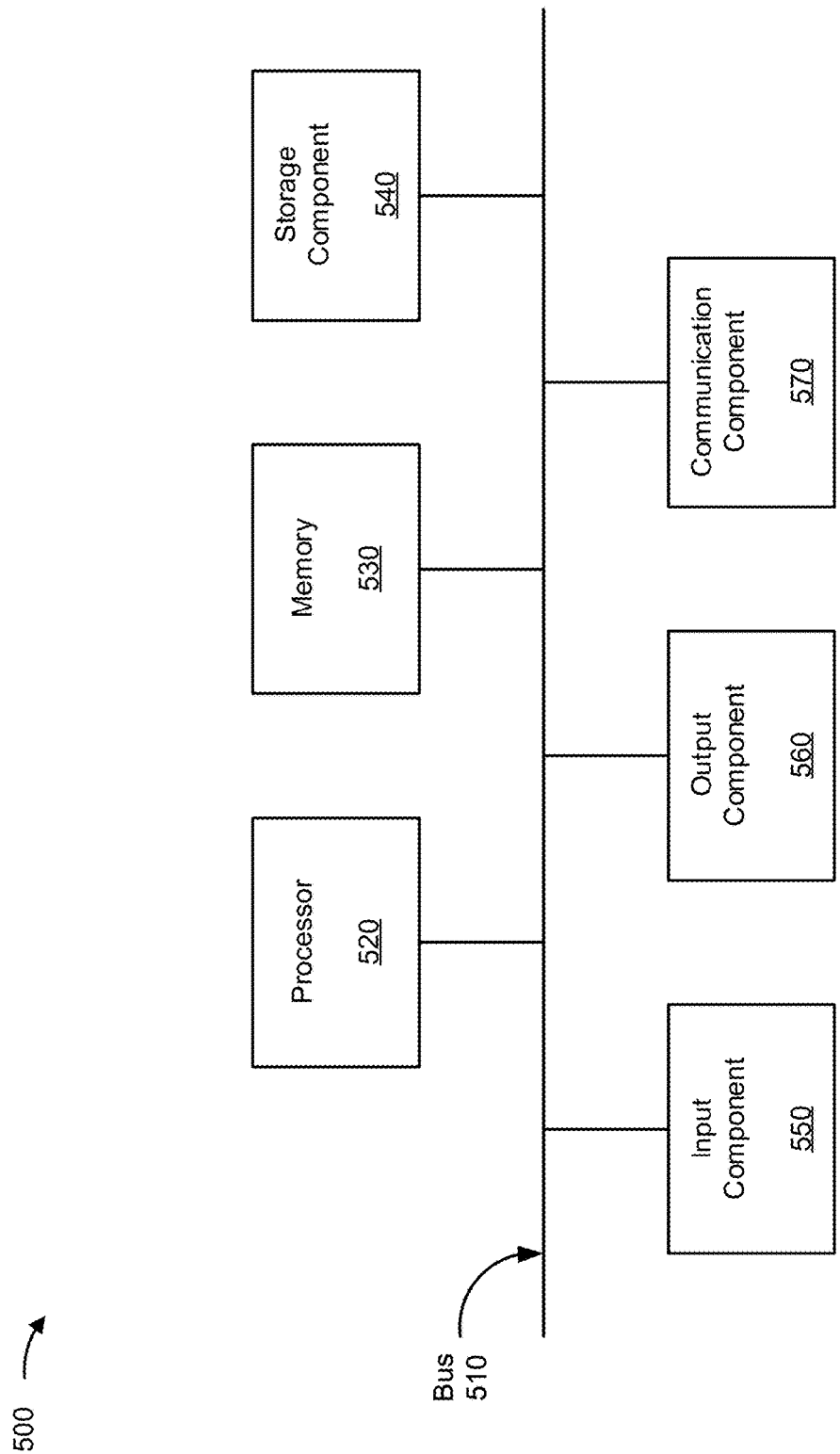
FIG. 5 is a diagram of example components of one or more devices of FIG. 4.

FIG. 5 is a diagram of example components of a device 500, which may correspond to the operation management system 401, the wearable device 430, and/or the user device 440. In some implementations, the operation management system 401, the wearable device 430, and/or the user device 440 may include one or more devices 500 and/or one or more components of device 500. As shown in FIG. 5, device 500 may include a bus 510, a processor 520, a memory 530, a storage component 540, an input component 550, an output component 560, and a communication component 570.

Bus 510 includes a component that enables wired and/or wireless communication among the components of device 500. Processor 520 includes a central processing unit, a graphics processing unit, a microprocessor, a controller, a microcontroller, a digital signal processor, a field-programmable gate array, an application-specific integrated circuit, and/or another type of processing component. Processor 520 is implemented in hardware, firmware, or a combination of hardware and software. In some implementations, processor 520 includes one or more processors capable of being programmed to perform a function. Memory 530 includes a random access memory, a read only memory, and/or another type of memory (e.g., a flash memory, a magnetic memory, and/or an optical memory).

Storage component 540 stores information and/or software related to the operation of device 500. For example, storage component 540 may include a hard disk drive, a magnetic disk drive, an optical disk drive, a solid state disk drive, a compact disc, a digital versatile disc, and/or another type of non-transitory computer-readable medium. Input component 550 enables device 500 to receive input, such as user input and/or sensed inputs. For example, input component 550 may include a touch screen, a keyboard, a keypad, a mouse, a button, a microphone, a switch, a sensor, a global positioning system component, an accelerometer, a gyroscope, and/or an actuator. Output component 560 enables device 500 to provide output, such as via a display, a speaker, and/or one or more light-emitting diodes. Communication component 570 enables device 500 to communicate with other devices, such as via a wired connection and/or a wireless connection. For example, communication component 570 may include a receiver, a transmitter, a transceiver, a modem, a network interface card, and/or an antenna.

Device 500 may perform one or more processes described herein. For example, a non-transitory computer-readable medium (e.g., memory 530 and/or storage component 540) may store a set of instructions (e.g., one or more instructions, code, software code, and/or program code) for execution by processor 520. Processor 520 may execute the set of instructions to perform one or more processes described herein. In some implementations, execution of the set of instructions, by one or more processors 520, causes the one or more processors 520 and/or the device 500 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 5 are provided as an example. Device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
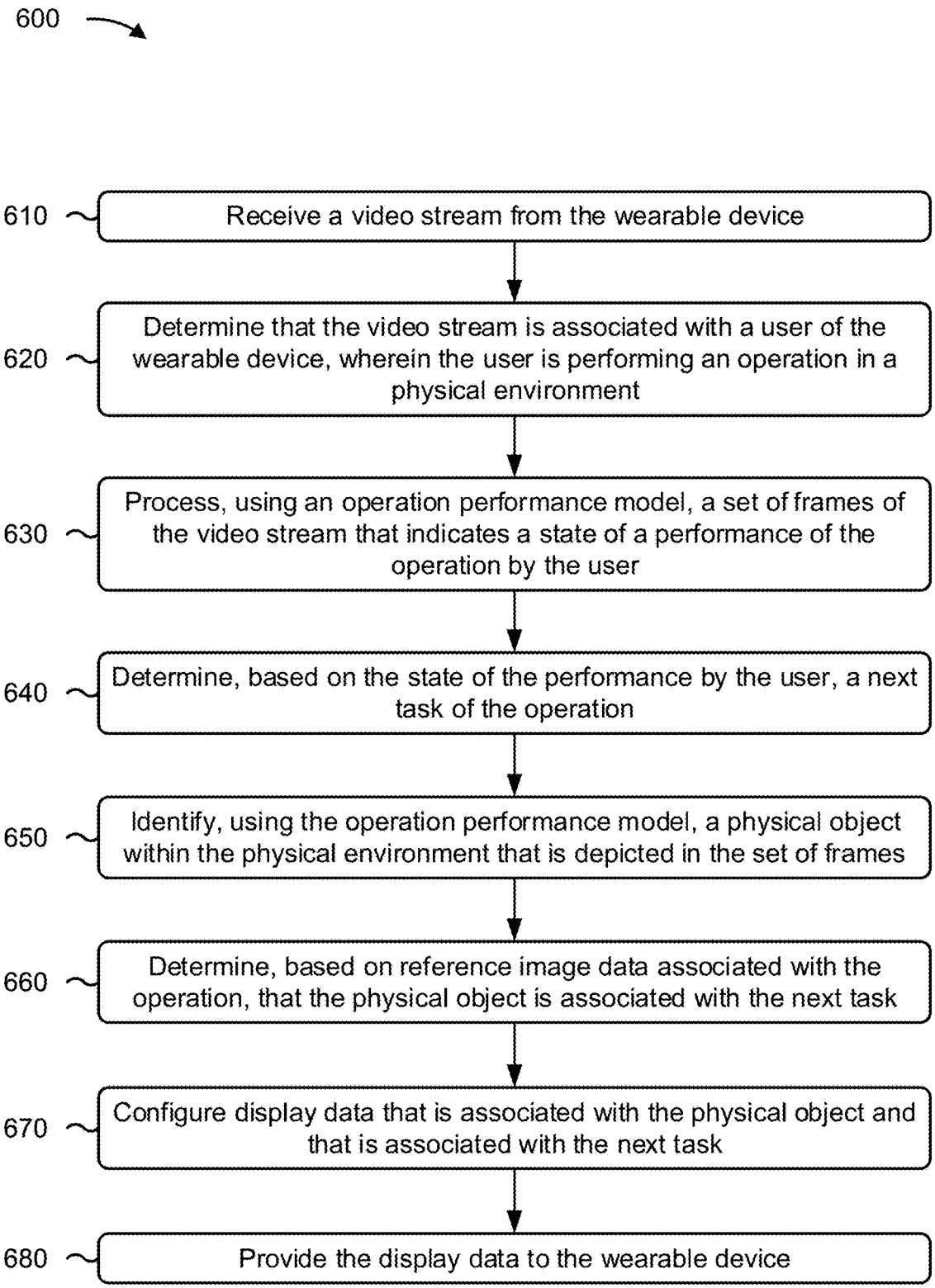
FIG. 6 is a flowchart of an example process associated with an operation management system described herein.

FIG. 6 is a flowchart of an example process 600 associated with an operation management system described herein. In some implementations, one or more process blocks of FIG. 6 may be performed by an operation management system (e.g., operation management system 401). In some implementations, one or more process blocks of FIG. 6 may be performed by another device or a group of devices separate from or including the operation management system, such as a wearable device (e.g., wearable device 430), and/or a user device (e.g., user device 440). Additionally, or alternatively, one or more process blocks of FIG. 6 may be performed by one or more components of device 500, such as processor 520, memory 530, storage component 540, input component 550, output component 560, and/or communication component 570.

As shown in FIG. 6, process 600 may include receiving a video stream from the wearable device (block 610). For example, the operation management system may receive a video stream from the wearable device, as described above. As further shown in FIG. 6, process 600 may include determining that the video stream is associated with a user of the wearable device (block 620). For example, the operation management system may determine that the video stream is associated with a user of the wearable device, as described above. In some implementations, the user is performing an operation in a physical environment.

In some implementations, determining that the video stream is associated with the user performing the operation may include identifying an identifier received in association with the video stream, and determining, based on an operation mapping, that the identifier is associated with the operation, wherein the set of frames is processed based on determining that the identifier is associated with the operation.

As further shown in FIG. 6, process 600 may include processing, using an operation performance model, a set of frames of the video stream that indicates a state of a performance of the operation by the user (block 630). For example, the operation management system may process, using an operation performance model, a set of frames of the video stream that indicates a state of a performance of the operation by the user, as described above. In some implementations, the operation performance model is trained based on a plurality of historical videos of historical performances of the operation by other users of other wearable devices. The plurality of historical videos may be captured by the other wearable devices.

As further shown in FIG. 6, process 600 may include determining, based on the state of the performance by the user, a next task of the operation (block 640). For example, the operation management system may determine, based on the state of the performance by the user, a next task of the operation, as described above. As further shown in FIG. 6, process 600 may include identifying, using the operation performance model, a physical object within the physical environment that is depicted in the set of frames (block 650). For example, the operation management system may identify, using the operation performance model, a physical object within the physical environment that is depicted in the set of frames, as described above. In some implementations, the operation performance model comprises a computer vision model that is trained based on the plurality of historical videos depicting the historical performances involving other objects that are related to the physical object.

As further shown in FIG. 6, process 600 may include determining, based on reference image data associated with the operation, that the physical object is associated with the next task (block 660). For example, the operation management system may determine, based on reference image data associated with the operation, that the physical object is associated with the next task, as described above. In some implementations, determining that the physical object is associated with the next task may include determining, using the operation performance model, that the reference image data is associated with a reference object that corresponds to the physical object, wherein the reference object was involved in one or more of the historical performances, and determining, based on a mapping in a task reference data structure, that the reference object is associated with performing the next task.

As further shown in FIG. 6, process 600 may include configure display data that is associated with the physical object and that is associated with the next task (block 670). For example, the operation management system may configure display data that is associated with the physical object and that is associated with the next task, as described above. In some implementations, the display data is associated with an indicator that identifies the physical object and task information associated with performing the next task. In some implementations, configuring the display data may include identifying a reference point of the physical environment that is depicted in the video stream, determining a location of the physical object relative to the reference point, and generating the display data to identify the location of the physical object relative to a position of the wearable device.

As further shown in FIG. 6, process 600 may include providing the display data to the wearable device (block 680). For example, the operation management system may provide the display data to the wearable device, as described above. In some implementations, the display data is configured according to spatial locationing information, associated with a display device of the wearable device, that identifies a location of the physical object within the physical environment relative to the display device.

In some implementations, the set of frames is a first set of frames and the indicator is configured to be embedded within a second set of frames of the video stream. In such an example, process 600 may include receiving the second set of frames, receiving, from the wearable device or a user device, feedback that indicates a level of accuracy of the display data, and updating the operation performance model based on the feedback and the second set of frames.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
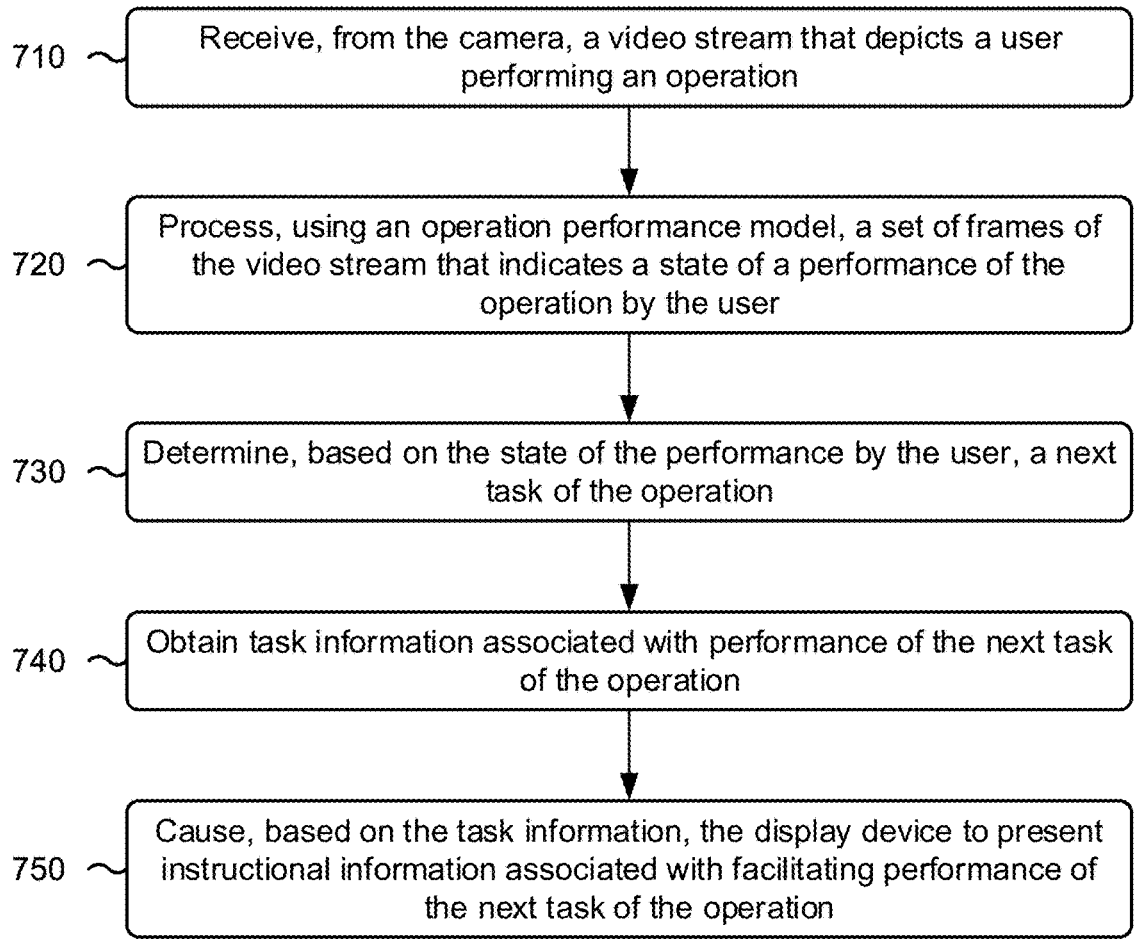
FIG. 7 is a flowchart of an example process associated with a wearable device described herein.

FIG. 7 is a flowchart of an example process 700 associated with a wearable device described herein. In some implementations, one or more process blocks of FIG. 7 may be performed by a wearable device (e.g., wearable device 430). In some implementations, one or more process blocks of FIG. 7 may be performed by another device or a group of devices separate from or including the wearable device, such as operation management system (e.g., operation management system 401), and/or a user device (e.g., user device 440). Additionally, or alternatively, one or more process blocks of FIG. 7 may be performed by one or more components of device 500, such as processor 520, memory 530, storage component 540, input component 550, output component 560, and/or communication component 570.

As shown in FIG. 7, process 700 may include receiving, from the camera, a video stream that depicts a user performing an operation (block 710). For example, the wearable device may receive, from the camera, a video stream that depicts a user performing an operation, as described above.

As further shown in FIG. 7, process 700 may include processing, using an operation performance model, a set of frames of the video stream that indicates a state of a performance of the operation by the user (block 720). For example, the wearable device may process, using an operation performance model, a set of frames of the video stream that indicates a state of a performance of the operation by the user, as described above. In some implementations, the operation performance model is trained based on a plurality of historical videos of historical performances of the operation by other users. In some implementations, the operation performance model comprises a computer vision model that is locally executed on the wearable device.

As further shown in FIG. 7, process 700 may include determining, based on the state of the performance by the user, a next task of the operation (block 730). For example, the wearable device may determine, based on the state of the performance by the user, a next task of the operation, as described above. In some implementations, the wearable device, when determining the next task, may compare a frame of the set of frames to a reference image associated with the next task, and identify the next task based on the frame being associated with the reference image.

As further shown in FIG. 7, process 700 may include obtaining task information associated with performance of the next task of the operation (block 740). For example, the wearable device may obtain task information associated with performance of the next task of the operation, as described above. In some implementations, process 700 includes obtaining, from a task reference data structure, the task information based on the task information being mapped to a task identifier of the next task in the task reference data structure.

As further shown in FIG. 7, process 700 may include causing, based on the task information, the display device to present instructional information associated with facilitating performance of the next task of the operation (block 750). For example, the wearable device may cause, based on the task information, the display device to present instructional information associated with facilitating performance of the next task of the operation, as described above. In some implementations, process 700 includes causing the display device to embed the instructional information within a presentation of the video stream on the display device.

In some implementations, the wearable device includes a spatial locator, and process 700 may include identifying, in the set of frames and based on the task information, a physical object that is associated with the next task, determining that a frame of the video stream depicts the physical object based on image data of the frame corresponding to reference image data, determining, based on spatial locationing information from the spatial locator and a frame location of the physical object, a location of the physical object relative to a position of the display device, and causing the display device to indicate the location of the physical object relative to the position of the display device.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

In the foregoing disclosure, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present disclosure. Additionally, the described embodiments/examples/implementations should not be interpreted as mutually exclusive and should instead be understood as potentially combinable if such combinations are permissive in any way. In other words, any feature disclosed in any of the aforementioned examples or implementations may be included in any of the other aforementioned examples or implementations.

As used herein, the term "component" is intended to be broadly construed as hardware, firmware, and/or a combination of hardware and software. As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, or the like) on which machine-readable instructions (e.g., code in the form of, for example, software and/or firmware) can be stored. The instructions may be stored for any suitable duration of time, such as permanently, for an extended period of time (e.g., while a program associated with the instructions is executing), or for a short period of time (e.g., while the instructions are cached, during a buffering process, or the like). Further, as used herein, each of the terms "tangible machine-readable medium," "non-transitory machine-readable medium" and "machine-readable storage device" is expressly defined to exclude propagating signals. That is, as used in any claim herein, a "tangible machine-readable medium," a "non-transitory machine-readable medium," and a "machine-readable storage device," or the like, should not be interpreted as being implemented as a propagating signal.

As used herein, satisfying a threshold may, depending on the context, refer to a value being greater than the threshold, greater than or equal to the threshold, less than the threshold, less than or equal to the threshold, equal to the threshold, not equal to the threshold, or the like.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, as used herein, relational terms such as first and second, top and bottom, or the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

The terms "a" and "an" are defined as one or more unless explicitly stated otherwise herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

The abstract of the disclosure is provided to allow the reader to quickly ascertain the nature of the technical disclosure. It is submitted with the understanding that it will not be used to interpret or limit the scope or meaning of the claims. In addition, in the foregoing description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

What is claimed is:

1. A method of facilitating performance of an operation using a wearable device, comprising:
receiving, by a device, a video stream from the wearable device;
determining, by the device, that the video stream is associated with a user of the wearable device, wherein the user is performing the operation in a physical environment;

processing, by the device and using an operation performance model, a set of frames of the video stream that indicates a state of a performance of the operation by the user,
 wherein the operation performance model is trained based on a plurality of historical videos of historical performances of the operation by other users of other wearable devices,
  wherein the plurality of historical videos are captured by the other wearable devices;

determining, by the device and based on the state of the performance by the user, a next task of the operation;

identifying, by the device and using the operation performance model, a physical object within the physical environment that is depicted in the set of frames;

determining, based on reference image data associated with the operation, that the physical object is associated with the next task;

configuring, by the device, display data that is associated with the physical object and that is associated with the next task,
 wherein the display data is associated with an indicator that identifies the physical object and task information associated with performing the next task; and providing, by the device, the display data to the wearable device.

2. The method of claim 1, wherein determining that the video stream is associated with the user performing the operation comprises:
 identifying an identifier received in association with the video stream; and
 determining, based on an operation mapping, that the identifier is associated with the operation,
  wherein the set of frames is processed based on determining that the identifier is associated with the operation.

3. The method of claim 1, wherein the operation performance model comprises a computer vision model that is trained based on the plurality of historical videos depicting the historical performances involving other objects that are related to the physical object.

4. The method of claim 1, wherein determining that the physical object is associated with the next task comprises:
 determining, using the operation performance model, that the reference image data is associated with a reference object that corresponds to the physical object,
  wherein the reference object was involved in one or more of the historical performances; and
 determining, based on a mapping in a task reference data structure, that the reference object is associated with performing the next task.

5. The method of claim 1, wherein configuring the display data comprises:
 identifying a reference point of the physical environment that is depicted in the video stream;
 determining a location of the physical object relative to the reference point; and
 generating the display data to identify the location of the physical object relative to a position of the wearable device.

6. The method of claim 1, wherein the display data is configured according to spatial locationing information, associated with a display device of the wearable device, that identifies a location of the physical object within the physical environment relative to the display device.

7. The method of claim 1, wherein the set of frames is a first set of frames and the indicator is configured to be embedded within a second set of frames of the video stream, further comprising:
 receiving the second set of frames;
 receiving, from the wearable device or a user device, feedback that indicates a level of accuracy of the display data; and
 updating the operation performance model based on the feedback and the second set of frames.

8. A device, comprising:
one or more memories; and
one or more processors, communicatively coupled to the one or more memories, configured to:
 receive a video stream from a wearable device associated with a user;
 determine that the video stream is associated with the user performing an operation in a physical environment;
 determine, using an operation performance model, a state of a performance of the operation by the user,
  wherein the state of the performance is determined based on the operation performance model processing a set of frames of the video stream that depicts the state of the performance of the operation by the user;
 determine, based on the state of the performance by the user, a next task of the operation;
 identify, using the operation performance model, a physical object depicted in the set of frames that is associated with the next task;
 generate display data that is associated with the physical object and performance of the next task of the operation; and
 provide the display data to the wearable device.

9. The device of claim 8, wherein the one or more processors, when determining that the video stream is associated with the user performing the operation, are configured to:
 determine a location of the wearable device within the physical environment based on spatial locationing information received in association with the video stream; and
 determine, based on an operation mapping, that the location is associated with the operation,
  wherein the set of frames are processed based on determining that the location is associated with the operation.

10. The device of claim 8, wherein the operation performance model comprises a computer vision model that is based on a plurality of historical videos of historical performances of the operation by other users,
 wherein the plurality of historical videos are associated with one or more other wearable devices that are a same type as the wearable device.

11. The device of claim 8, wherein the one or more processors, when identifying the physical object, is configured to:
 determine, using the operation performance model, that a frame of the set of frames depicts the physical object based on image data of the frame including a particular shape; and
 determine, based on a mapping in a task reference data structure, that the particular shape is associated with the physical object.

12. The device of claim 8, wherein the one or more processors, when generating the display data, are configured to:
- determine a location of the physical object based on spatial locationing information from the wearable device; and
- generate the display data to include an indicator of the location of the physical object relative to a position of the wearable device that is indicated in the spatial locationing information.

13. The device of claim 8, wherein the display data includes an indication of the physical object relative to a position of the wearable device.

14. The device of claim 8, wherein the set of frames is a first set of frames and the display data is associated with an indicator that identifies the physical object, and
- wherein the one or more processors are further configured to:
  - after providing the display data, receive, from the wearable device, a second set of frames of the video stream that include the indicator;
  - identify, using the operation performance model, a subsequent state of the performance of the operation based on the second set of frames; and
  - provide, to the wearable device and based on identifying the subsequent state, a notification associated with removing the indicator.

15. A wearable device comprising:
- a camera;
- a display device; and
- a controller that is configured to:
  - receive, from the camera, a video stream that depicts a user performing an operation;
  - process, using an operation performance model, a set of frames of the video stream that indicates a state of a performance of the operation by the user,
    - wherein the operation performance model is trained based on a plurality of historical videos of historical performances of the operation by other users;
  - determine, based on the state of the performance by the user, a next task of the operation;
  - obtain task information associated with performance of the next task of the operation; and
  - cause, based on the task information, the display device to present instructional information associated with facilitating performance of the next task of the operation.

16. The wearable device of claim 15, wherein the operation performance model comprises a computer vision model that is locally executed on the wearable device.

17. The wearable device of claim 15, wherein the controller, when determining the next task of the operation, is configured to:
- compare a frame of the set of frames to a reference image associated with the next task; and
- identify the next task based on the frame being associated with the reference image.

18. The wearable device of claim 15, wherein the controller, when obtaining the task information, is configured to:
- obtain, from a task reference data structure, the task information based on the task information being mapped to a task identifier of the next task in the task reference data structure.

19. The wearable device of claim 15, wherein the controller when causing the display device to present the instructional information, is configured to:
- cause the display device to embed the instructional information within a presentation of the video stream on the display device.

20. The wearable device of claim 15, further comprising:
- a spatial locator,
  - wherein the controller is further configured to:
    - identify, in the set of frames and based on the task information, a physical object that is associated with the next task;
    - determine that a frame of the video stream depicts the physical object based on image data of the frame corresponding to reference image data;
    - determine, based on spatial locationing information from the spatial locator and a frame location of the physical object, a location of the physical object relative to a position of the display device; and
    - cause the display device to indicate the location of the physical object relative to the position of the display device.

* * * * *